US010264007B2

(12) United States Patent
Fehrman

(10) Patent No.: US 10,264,007 B2
(45) Date of Patent: *Apr. 16, 2019

(54) MALWARE BEACONING DETECTION METHODS

(71) Applicant: NetSec Concepts LLC, Sturgis, SD (US)

(72) Inventor: Brian Fehrman, Sturgis, SD (US)

(73) Assignee: NETSEC CONCEPTS, LLC, Sturgis, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/956,933

(22) Filed: Apr. 19, 2018

(65) Prior Publication Data

US 2018/0241765 A1  Aug. 23, 2018

Related U.S. Application Data

(63) Continuation of application No. 14/981,635, filed on Dec. 28, 2015, now Pat. No. 9,979,741.

(51) Int. Cl.
G11C 7/00 (2006.01)
H04L 29/06 (2006.01)
H04W 12/08 (2009.01)

(52) U.S. Cl.
CPC .......... H04L 63/1425 (2013.01); H04L 63/02 (2013.01); H04L 63/0254 (2013.01); H04W 12/08 (2013.01); H04L 63/166 (2013.01)

(58) Field of Classification Search
CPC . H04L 63/02; H04L 63/0254; H04L 63/1425; H04L 63/166; H04W 12/08
See application file for complete search history.

(56) References Cited

U.S. PATENT DOCUMENTS

| 7,966,395 | B1 | 6/2011 | Pope et al. | |
|---|---|---|---|---|
| 2010/0162399 | A1* | 6/2010 | Sheleheda | H04L 63/1416 726/24 |
| 2014/0293804 | A1* | 10/2014 | Kakadia | H04L 41/145 370/252 |

* cited by examiner

Primary Examiner — Abiy Getachew
(74) Attorney, Agent, or Firm — Goodhue, Coleman & Owens, P.C.

(57) ABSTRACT

A method for detecting malware beaconing in a network, the method includes capturing network traffic over a network connection at a network connected device, representing the network traffic over the network connection as a set of tuples wherein each of the tuples includes at least a source Internet Protocol address, a destination Internet Protocol address, and a destination port, associating timestamps with each of the set of tuples, and analyzing the tuples using the timestamps based on frequency of connections to determine malware beaconing on the network, wherein the analyzing is performed by a computing device.

20 Claims, 4 Drawing Sheets

US 10,264,007 B2

MALWARE BEACONING DETECTION METHODS

PRIORITY STATEMENT

This application is a continuation of and claims priority to U.S. patent application Ser. No. 14/981,635 filed Dec. 28, 2015, hereby incorporated by reference in its entirety.

FIELD OF THE INVENTION

The present invention relates to information security. More particularly, but not exclusively, the present invention relates to the detection of malware.

BACKGROUND

Malicious software ("Malware") includes software that is designed to gain access and/or damage a computer or subvert its functioning without the knowledge of the owner. Malware is a tremendous problem with the number of computer security incidents continuing to increase. Malware infections can have enormous direct and indirect costs on individuals, businesses and other organizations.

One type of malware is the Remote Access Trojan horse. Generally, a Trojan horse includes malware embedded in an application or system that performs or appears to perform a useful function but also is performing some form of unauthorized action. A Remote Access Trojan horse generally includes a back door for administrative access and/or control over a target computer.

Malware and Remote Access Trojan horse software which are placed on computing devices use network resources to connect back to the controller/attacker associated with the software. It is very typical for such software to be required to transmit network traffic through host, and network resident firewalls. Such firewalls have stateful mechanisms which only permit traffic to be transmitted for a specific duration of time before considering that the connection in question is no longer viable. As such, malware of this nature invariably exhibits a periodic traffic transmission behavior resembling a beacon. In order to detect this behavior, traditional network defenses have focused on a content signature approach. In the content signature approach, a characterization of what is known to be malicious is used to determine whether particular software is malicious. This characterization or model may involve significant resources (including human resources) and additional signatures may be needed whenever new instances of malware are identified. Of course, the effectiveness of content signature-based malware detection methods depend upon characterizations that may not necessarily be accurate or complete. Therefore, problems remain with malware detection, in part because they do not recognize or appreciate the periodic traffic transmission associated with malware and how to detect malware using this observation. What is needed are improved methods of malware detection.

SUMMARY

Therefore, it is a primary object, feature, or advantage of the present invention to improve over the state of the art.

It is a further object, feature, or advantage of the present invention to provide for malware detection.

It is a still further object, feature, or advantage of the present invention to provide for malware detection without needing to rely on content signature-based detection methods.

Another object, feature, or advantage is to use the periodic nature of malware beaconing to identify it as such.

Yet another object, feature, or advantage is to represent network connections as time varying signals and transform this representation from the time domain to the frequency domain.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

Malware detection is described which provide for the detection of malware by detecting algorithmic driven beaconing traffic from ordinary human driven network traffic. According to one aspect, a method for detecting malware beaconing in a network is provided. The method includes capturing network traffic over a network connection at a network connected device, representing the network traffic over the network connection as a set of tuples wherein each of the tuples includes at least a source Internet Protocol address, a destination Internet Protocol address, and a destination port. The method further includes associating timestamps with each of the set of tuples, and analyzing the tuples using the timestamps based on frequency of connections to determine malware beaconing on the network, wherein the analyzing is performed by a computing device. The analyzing the set of tuples may include performing a Fourier analysis. The Fourier analysis may be a discrete Fourier transform. The analyzing may be provided by inserting each of the connections into a time bucket based on the corresponding timestamp and inserting each duration between consecutive connections into duration buckets. Each time bucket may be stored in a time bucket hash map and each duration bucket may be stored in a duration hash map. The method may further provide for determining a smallest range of consecutive duration buckets containing T percent of all connections, wherein T is a threshold value. T may be between 80 percent and 90 percent or other appropriate range. The analyzing may further provide for determining values for a low end and a high end of the smallest range of consecutive duration buckets containing T percent of all the connections. The analyzing may further include the step of determining a difference in time between the consecutive duration buckets, determining a spread as a difference between first and last timestamps, or otherwise determining at least one of range values, range, spread, fill, and size, or other statistical measures associated with the network traffic. The method may further include displaying to a user one or more connections identified as malware beaconing, alerting a user of the presence of malware beaconing when a measure of the network traffic exceeds a threshold associated with malware beaconing, or reconfiguring a firewall to prevent network connections to the destination address and the destination port associated with the malware beaconing. The network may include a firewall having a stateful mechanism. The method may further include identifying software containing the malware, or removing the malware from the network.

According to another aspect, a machine for detecting malware beaconing in a network is provided. The machine includes a network connection for connecting to the network, a non-transitory machine readable storage medium, and a hardware processor operatively connected to the network connection and the machine readable storage medium. The non-transitory machine readable storage medium contains instructions for the hardware processor for capturing network traffic over the network connection, representing the network traffic over the network connection as a set of tuples wherein each of the tuples includes at least a source Internet Protocol address, a destination Internet Protocol address, and a destination port, associating timestamps with each of the set of tuples, and analyzing the tuples using the timestamps based on frequency of connections to determine malware beaconing on the network, wherein the analyzing is performed by a computing device.

DETAILED DESCRIPTION

Figure 1:
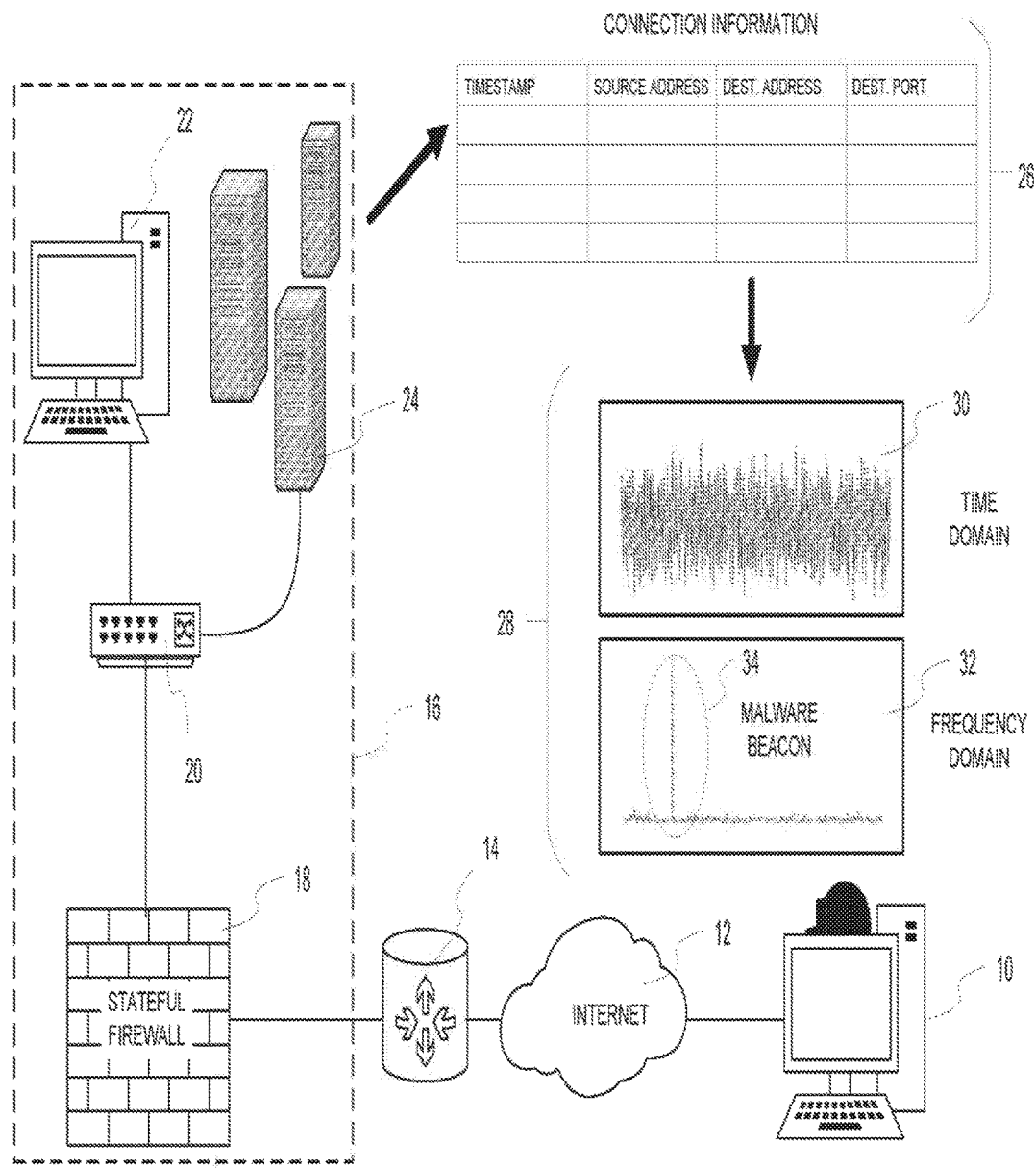
FIG. 1 is a pictorial representation of one aspect of the invention which provides for malware detection by distinguishing algorithmic driven beaconing traffic

Methods, systems, and apparatus are provided for malware detection through distinguishing algorithmic driven beaconing traffic associated with malware from ordinary human driven network traffic. This may be accomplished by converting a representation of traffic from the time domain to the frequency domain.

As previously explained many different types of malware report back to an attacker or "call home" especially with command and control (C2) channels. The malware reports back with a beacon message. The malware may allow or enable communications for C2 messages and results. Thus the attacks can be run remotely by the attackers. Thus commands are transferred to malware infected machines, the machines execute the commands, and results are returned to the attacker. The attacker may use commands to perform any number of different activities such as, but not limited to, exploring networks to identify vulnerabilities and high value machines, infect other machines, take part in a coordinated attack, execute programs, record user activity, copy data including valuable intellectual property, and other activities. After results are returned, the process generally repeats with additional commands sent, the commands executed by compromised machines, and the results returned.

There are various other challenges associated with C2 channels. For example, compared to normal traffic, command and control messages are relatively small and the channels used are ordinary and common such as HTTP, HTTPS, email, chat, DNS, and other channels frequently used by a network's users.

However, as explained previously malware typically reports back at predefined intervals. One of the reasons for this is the presence of stateful firewalls. A stateful firewall is a type of firewall that attempts to track the state of network connections when filtering packets so that only packets associated with known alive connections are allowed. If there is no traffic for a certain time period over a connection then the connection is closed. Thus, characteristics of malware used to avoid one type of security measure (the stateful firewall) can be leveraged to identify malware beaconing by converting a representation of traffic from the time domain to the frequency domain or otherwise examining the frequency of beaconing activity.

The network connections may be treated as time-varying signals and thus signal processing can be applied. Two domains may be considered. The time domain which relates to connections over time and the frequency domain which is the frequency at which the connections occur. The frequency as which the beaconing occurs can be determined through Fourier analysis such as through a Discrete Fourier Transform (DFT). This allows for the transformation of signals from the time or spatial domain to the frequency domain.

Beaconing activity associated with malware is detectable when viewed in the frequency domain because the beaconing activity happens at regular intervals which is in contrast to the random manner in which most users interact.

FIG. 1 illustrates one example of the malware beaconing detection. As shown in FIG. 1, there is a machine associated with a remote attacker 10. The remote attacker 10 is operatively connected through the internet 12 or other network, through a router 14, and through a stateful firewall 18 associated with a network 16 to a network switch 20. Various machines including machine 22 and servers 24 are operatively connected to the switch as well. Note that the network shown in FIG. 1 is merely one example of a simplified network topology for explanatory purposes. Any number of different network topologies may be used. Connection information 26 from one or more devices on the network such as machine 22, servers 24, switch 20, or any number of other network devices having a network connection. The connection information may include timestamp information, source address information, destination address information, and a destination port. The network connections may be considered time varying signals as shown in the data analysis 28. The analysis allows for the transformation of the signals from the time domain 30 to the frequency domain such as through Fourier analysis or otherwise to provide frequency domain information 32. Once in the frequency domain, a malware beacon 34 is recognizable such as by recognizing that its amplitude exceeds a threshold.

Traffic may be represented using the unique 4-tuple properties of a network connection. Specifically for the Open Systems Interconnection (OSI) layer 4 Transport Control Protocol (TCP), and User Datagram Protocol (UDP), a unique connection stream is defined as the 3-tuple of source IPv4/IPv6 address, destination IPv4/IPv6 address, and destination TCP/UDP port.

Traffic may be examined in either real time, or offline using the well accepted standard packet capture (PCAP) file format or other type of format. Connection frequency may be examined over time using the internal network source address as a trigger for measuring communication initiation over a time period. Statistical frequency analysis may be performed across the unique connection stream to determine the traffic initiated per second. The resulting dataset is then converted from the time base domain to a frequency domain using a Discrete Fast Fourier Transform (DFFT). The resulting frequency domain datasets may then be plotted in graphical form for visual analysis. Because a malware beaconing behavior is algorithmically driven, it usually has a very regular period such as one beacon transaction per second in an idle state, for example. This behavior is difficult to distinguish from other client station initiated traffic however after the DFFT transform is applied, any long term regular beaconing traffic is displayed as high frequencies with associated sub-harmonics and becomes statistically significant in the resulting datasets.

It is to be understood that various alternatives may be used as opposed to using a Discrete Fast Fourier Transform (DFFT). These may include any number of other examples of Fourier-related transforms for transformations from the time domain to the frequency domain and other alternative methodologies.

It is also to be understood that instead of merely visually displaying the malware beaconing activity, any number of actions may be taken. This may include alerting an administrator or other user of the presence of the malware beaconing activity, re-configuring a firewall such as to block packet activity associated with the malware beacon, identifying software associated with the malware beaconing activity such as by identifying processes executing on a malware infected machine, removing the malware, quarantining one or more infected machines, or other actions such as may be known.

Figure 2:
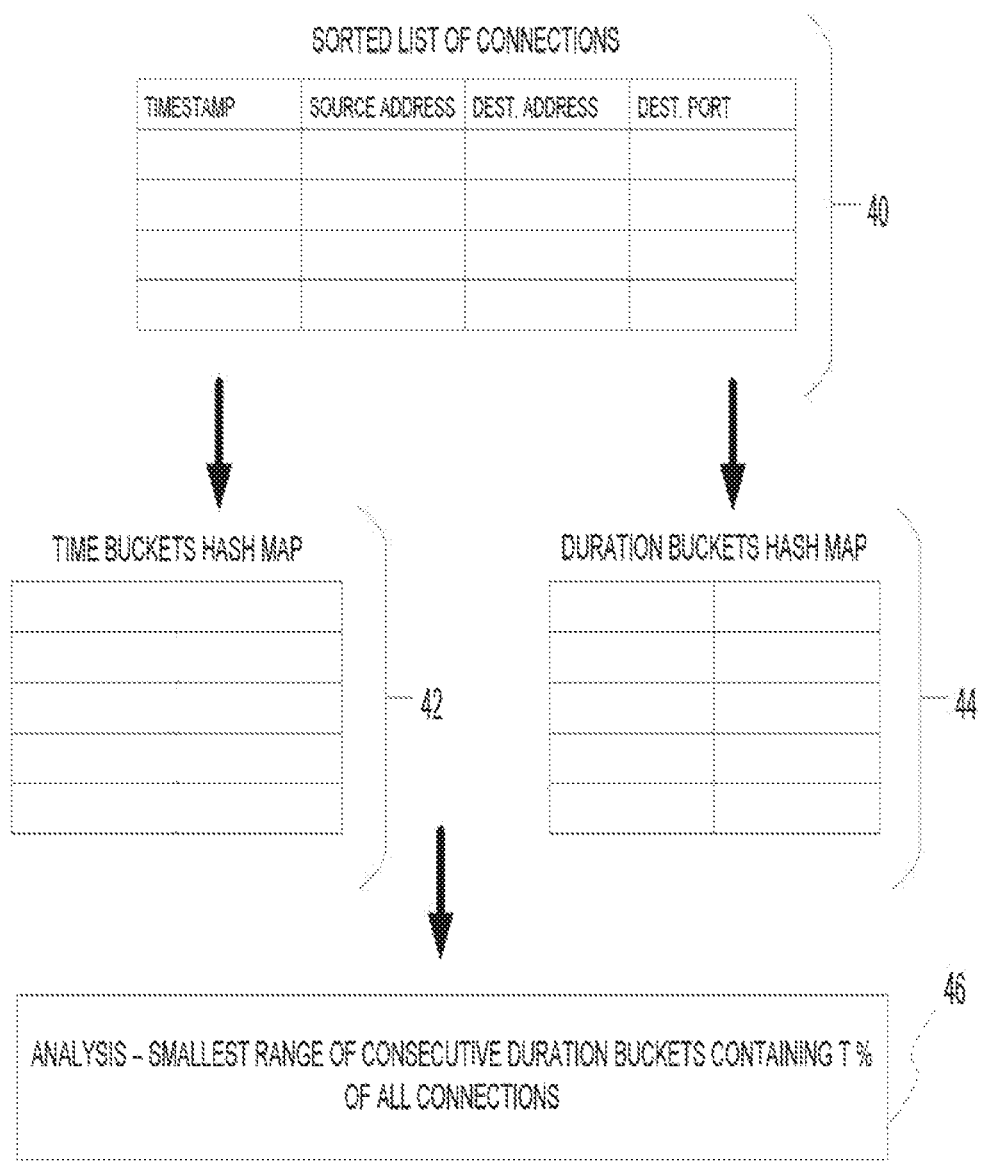
FIG. 2 illustrates another example of an algorithm for use in malware detection.

According to another algorithm, a sorted list of connections for a unique tuple (source IP address, destination IP address, and destination port) is provided along with a timestamp. This sorted list may be obtained in various ways such as from a network device connected to a network. FIG. 2 illustrates a sorted list of connections 40. As shown in FIG. 2, each connection is inserted into a time bucket based on the timestamp. The *time buckets* are stored as a hash map 42 and the keys may be determined by dividing the timestamp by the size of the bucket in milliseconds. For example, a timestamp of 16 with bucket size 5 would go into bucket 16/5=3. Although this is a convenient and efficient method to determine which bucket to place a timestamp in, the same result may be accomplished in other ways through other calculations or application of logic as may be appropriate or desirable in a particular implementation.

Next, the duration is inserted between consecutive connections into duration buckets. The duration buckets may be stored in a hash map 44 with the duration in milliseconds between connections as the key.

After creating both sets of buckets, an analysis 46 may be performed. The analysis may begin by determining the smallest range of consecutive duration buckets that contains T % of all connections is determined. For purposes here, T is a threshold value set between 80 and 90 percent, although other ranges may be contemplated as may be appropriate in particular situations based on the network traffic.

Figure 3:
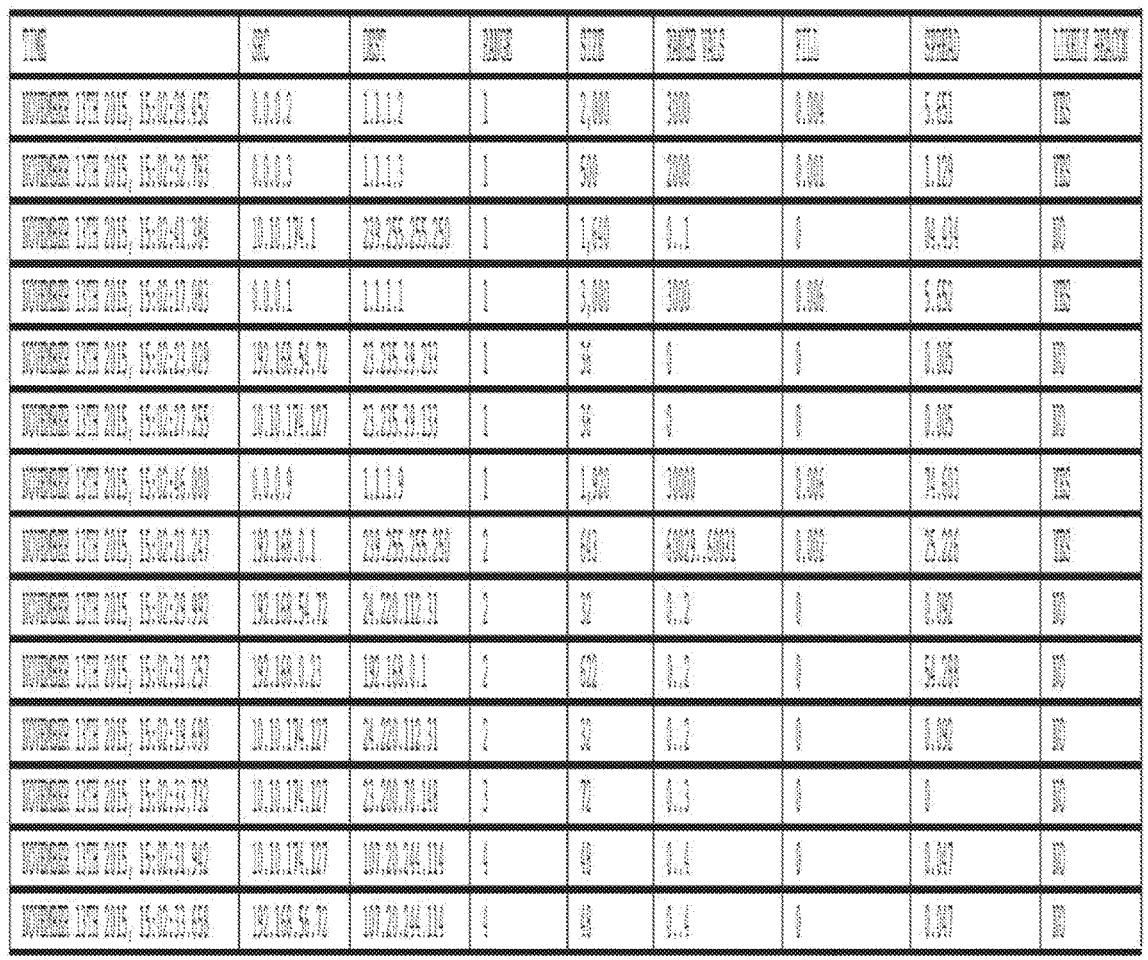
FIG. 3 is a table illustrating various measures of beaconing activity.

Various examples of information may then be reported as a part of the analysis. The information may include, without limitation:

Ranges values=Values on the low and high end of the range obtained in the previous step (milliseconds)
    Range=Difference in milliseconds between buckets obtained in previous step
    Spread=Difference between first and last timestamps
    Fill=Percent of buckets (1) filled over data set
    Size=Number of connections Each of these values may be used as a threshold to identify beaconing behavior. FIG. 3 illustrates examples of this analysis showing time stamps, source addresses, destination addresses, ranges, sizes, range values, fill percentages, and the spread. In addition a determination is shown as to whether the particular connections are identified as a beacon or not.

Of course, while the specific examples of information and range values described above may be helpful, it is contemplated that less or more information may be reported and smaller or larger ranges and different ranges may be used as may be appropriate in a particular environment or under a particular set of circumstances. Of course, other statistical measures may also be provided. In addition, it is contemplated that additional statistical information may be used such as to calculate confidence levels that particular connections are likely malware beacons or alternatively, such confidence levels may be used to assist in setting thresholds.

Thus, based on the information reported a user may determine if a malware beacon is present. The information may be reported or presented in text form (such as shown in FIG. 3) or visual form (such as shown in FIG. 1). Alternatively, or in addition, the software may alert the user of the presence of malware of the potential presence of malware when one of the values described above or other statistical value exceeds a set threshold or a malware beacon is otherwise detected.

Various software algorithms have been described throughout the Specification. It is to be understood that the various algorithms may be implemented in any number of different scripting or programming languages including Python, Perl, C, C++, Java, Ruby, R, Objective-C, or any number of other languages as may be appropriate on a particular platform, in a particular environment, or as a matter of user preference or familiarity.

Figure 4:
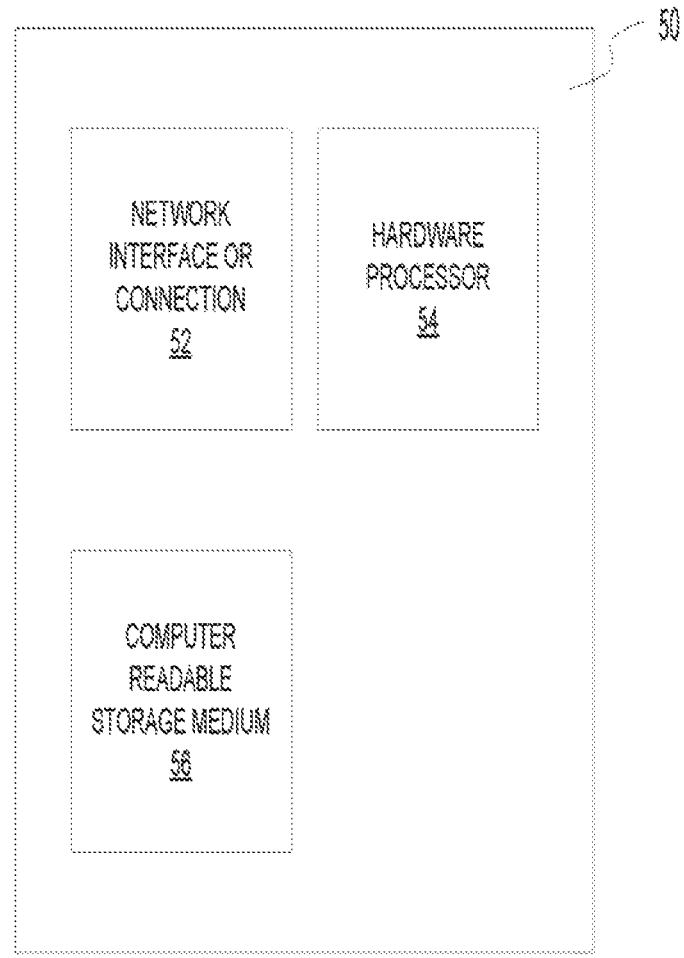
FIG. 4 illustrates one example of a machine for implementing the methodology shown and described to improve security of a network.

It should also be appreciated that various algorithms described herein may be executed by computing devices which are either off the network or on the network. For example, as shown in FIG. 4, a machine or computing device 50 is shown. The machine 50 includes a network interface of connection 52 for connecting to a network, a hardware processor 54, and a non-transitory computer readable storage medium 56. The non-transitory computer readable storage medium may contain instructions for the hardware processor 54 for performing a method. The method may include capturing network traffic over the network connection, representing the network traffic over the network connection as a set of tuples wherein each of the tuples includes at least a source Internet Protocol address, a destination Internet Protocol address, and a destination port, associating timestamps with each of the set of tuples, and analyzing the tuples using the timestamps based on frequency of connections to determine malware beaconing on the network. The machine or computing device 50 may be a network security device which performs other functionality, a standalone network security device, or other computing device.

Therefore, various methods, apparatus, and systems have been shown and described for improving information security be detecting beaconing behavior associated with malware. Although specific algorithms and methods have been described, it is contemplated that numerous variations and alternatives may be used as would be apparent to one skilled in the art having the benefit of this disclosure.

What is claimed is:

1. A method for detecting malware beaconing in a network, the method comprising:
    capturing network traffic over a network connection at a network connected device;
    representing the network traffic over the network connection as a set of tuples wherein each of the tuples defines an Open Systems Interconnection (OSI) layer 4 communications session and includes at least a source Internet Protocol address, a destination Internet Protocol address, and a destination port;
    associating timestamps with each of the set of tuples;
    performing a frequency analysis of the tuples using the timestamps based on frequency of connections to determine malware beaconing on the network, wherein the performing the frequency is analysis is performed by a computing device; and displaying to a user one or more connections identified as malware beaconing.

2. The method of claim 1 wherein the performing the frequency analysis of the set of tuples comprises performing a Fourier analysis.

3. The method of claim 2 wherein the Fourier analysis is a discrete Fourier transform.

4. The method of claim 1 wherein the performing the frequency analysis comprises inserting each of the connections into a time bucket based on the corresponding timestamp and inserting each duration between consecutive connections into duration buckets.

5. The method of claim 4 wherein each time bucket is stored in a time bucket hash map.

6. The method of claim 5 wherein each of the duration buckets is stored in a duration hash map.

7. The method of claim 4 wherein the performing the frequency analysis further comprises determining a smallest range of consecutive duration buckets containing T percent of all connections, wherein T is a threshold value.

8. The method of claim 7 wherein T is at least 80 percent.

9. The method of claim 8 wherein T is less than or equal to 90 percent.

10. The method of claim 7 wherein the performing the frequency analysis further comprises determining values for a low end and a high end of the smallest range of consecutive duration buckets containing T percent of all the connections.

11. The method of claim 7 wherein the performing the frequency analysis further comprises determining a difference in time between the consecutive duration buckets.

12. The method of claim 7 wherein the performing the frequency analysis further comprises determining a spread as a difference between first and last timestamps.

13. The method of claim 7 wherein the performing the frequency analysis further comprises determining at least one of range values, range, spread, fill, and size.

14. The method of claim 1 wherein the performing the frequency analysis further comprises obtaining at least one statistical measure associated with the network traffic.

15. The method of claim 1 further comprising reconfiguring a firewall to prevent network connections to the destination address and the destination port associated with the malware beaconing.

16. The method of claim 1 further comprising identifying software containing the malware.

17. The method of claim 16 further comprising removing the malware from the network.

18. The method of claim 1 wherein the network includes a firewall having a stateful mechanism.

19. The method of claim 11 wherein the performing the frequency analysis is based in part on data size of the network traffic.

20. A method for detecting malware beaconing in a network, the method comprising:

capturing network traffic over a network connection at a network connected device;

representing the network traffic over the network connection as a set of tuples wherein each of the tuples defines an Open Systems Interconnection (OSI) layer 4 communications session and includes at least a source Internet Protocol address, a destination Internet Protocol address, and a destination port;

associating timestamps with each of the set of tuples;

identifying malware beaconing on the network by analyzing the tuples using the timestamps based on frequency of connections, wherein the analyzing is performed by a computing device; and alerting a user of the presence of malware beaconing when a measure of data size of the network traffic exceeds a threshold associated with malware beaconing.

* * * * *